US006932889B1

(12) United States Patent
Holcomb

(10) Patent No.: US 6,932,889 B1
(45) Date of Patent: Aug. 23, 2005

(54) WATER TREATMENT DEVICE AND METHOD

(76) Inventor: Robert R. Holcomb, 1500 21st Ave. S. Suite 1516, Nashville, TN (US) 37212

(*) Notice: Subject to any disclaimer, the term of this patent is extended or adjusted under 35 U.S.C. 154(b) by 0 days.

(21) Appl. No.: 09/914,402
(22) PCT Filed: Jun. 27, 1997
(86) PCT No.: PCT/US97/11261
§ 371 (c)(1),
(2), (4) Date: Jul. 22, 2002
(87) PCT Pub. No.: WO97/49473
PCT Pub. Date: Dec. 31, 1997

Related U.S. Application Data
(60) Provisional application No. 60/022,015, filed on Jun. 27, 1996.

(51) Int. Cl.[7] ............... B01D 3/06; B01D 3/10; B01D 3/42; C02F 1/06; C02F 1/20
(52) U.S. Cl. ............... 203/11; 203/22; 203/39; 203/88; 203/91; 203/DIG. 8; 202/176; 202/197; 202/205; 210/664
(58) Field of Search ............... 203/4, 11, 22, 203/39, 40, 88, 91, DIG. 4, DIG. 8, DIG. 18; 159/2.1, 6.1, 47.1; 202/176, 197, 200, 202, 205, 185.1; 210/767, 664, 138, 143, 662, 670, 674; 364/500

(56) References Cited

U.S. PATENT DOCUMENTS

| | | | | | |
|---|---|---|---|---|---|
| 3,648,438 | A | * | 3/1972 | Arbogast ............... | 96/195 |
| 3,844,767 | A | * | 10/1974 | Rheinlander ............... | 75/460 |
| 3,884,767 | A | * | 5/1975 | Pottharst, Jr. ............... | 202/174 |
| 4,222,825 | A | * | 9/1980 | Eisden ............... | 203/11 |
| 4,385,357 | A | * | 5/1983 | Davis et al. ............... | 700/271 |
| 4,427,495 | A | * | 1/1984 | Masero ............... | 203/11 |
| 4,863,568 | A | * | 9/1989 | Wijn ............... | 202/185.2 |
| 4,953,694 | A | * | 9/1990 | Hayashi et al. ............... | 202/180 |
| 5,227,027 | A | * | 7/1993 | Topper ............... | 203/10 |
| 6,010,599 | A | * | 1/2000 | Wang et al. ............... | 202/205 |

FOREIGN PATENT DOCUMENTS

WO          94/02419          *  2/1994

* cited by examiner

Primary Examiner—Virginia Manoharan
(74) Attorney, Agent, or Firm—Garvey, Smith, Nehrbass & Doody, L.L.C.; Gregory C. Smith

(57) ABSTRACT

A point of use water purification unit for continuously and completely purifying water at all point of use for removing all chemicals, killing all microorganisms; the device having a computer monitored and controlled system for degassing, super heating and exploding water into a vacuum chamber, condensing the steam in a counter current cold brine apparatus and stored in a holding tank.

8 Claims, 8 Drawing Sheets

WATER TREATMENT DEVICE AND METHOD

This application is a 371 PCT/US97/11261 filed Jun. 27, 1997, which claims benefit of Ser. No. 60/022,015 filed Jun. 27, 1996.

BACKGROUND OF THE INVENTION

1. Field of the Invention

This present invention relates to a point of use water purification unit designed to continuously and completely purify water at all points of use such as homes, restaurants, hotels, military, sea and field units as well as desalination of sea water at the point of use. The device will remove all chemicals, all microorganisms and replete the water with essential ground minerals.

2. General Background of the Invention

Pure water for consumption, use in cooking and to maintain hygiene is a universal need. The purity and safety of water is deteriorating world wide. Tap water is no longer safe in major U.S. and foreign cities. It is contaminated by microbes, chemicals, heavy metals and in many instances ground water and sewage which gets into the distribution systems which are old and dilapidated. Improvement of municipal water treatment systems will be of little benefit. In line filtration and treatment along the distribution system will also be of little benefit because the distribution systems are old, leaky and in some instances are contaminated by lead joints. Pure water for our cities is a big challenge which will not be soon solved. It is therefore imperative that point of use water purification for all of the water used in the home be the immediate solution.

SUMMARY OF THE INVENTION

Accordingly, it is an object of this invention to provide a device that will accomplish the function of providing at the point of use a water treatment system that can convert any water into microbe free, chemical free, chlorine free, pleasant tasting, soft, mineral repleted water for the whole house, apartment, restaurant or other establishment.

Another object of the invention is to provide a system for water purification in which the feed water is preheated through a heat exchanger which takes energy from the systems refrigeration unit (condenser side) in order to conserve maximum energy.

Another object of this invention is to provide a thin water layer, centrifugal, vacuum chamber for degassing the feed water.

An additional object of this invention is to take advantage of the peculiar and little known physical character of degassed water. Pure water, when free of dissolved gases, may be heated above 100 degrees C. (up to 180 degrees C.) without boiling, but upon further heating, boiling may occur with explosive violence. This steam at (100 degrees C.) occupies a volume 1700 times greater than water at 100 degrees C.

It is a further object of the invention to isolate the degassing chamber by a series of three (3) in line valves. These valves are electronic and controlled by the on board computer controller.

Another object of the invention is to heat the degassed feed water to 260 degrees F. under pressure and then spray it into a heated 350 degrees F. vacuum chamber, where it flash vaporizes in an explosive manner, thereby providing the pressure and vaporization to evacuate the chamber into the condenser.

Another object of the invention is to provide a brine chilled counter current heat exchanger at 20 degrees F. to condense the vaporized pressured steam to chemically and microbiologically pure water at ambient temperature.

An additional object of this invention is to provide a holding tank containing a UV light source to maintain a microbial free condition of the water and providing high water level and lower water level sensors to regulate system operation through the on board microprocessor.

It is a further object of the invention to provide a booster pump which through in line pressure sensors will provide the desired pressure and flow throughout the system. This pressure and flow will be augmented by smaller in line pumps, if necessary.

A further object of the invention is to pass the water of this invention, as it flows from the holding tank, through a colloidal mineral column (to replace trace minerals) and lastly through a carbon column to assure good taste and freshness of the water.

An additional object of the invention is to provide an electronically heated (or other energy source) vegetable oil circulated through a jacket in the preheat heat exchanger and heated vacuum chamber.

A further object of the invention is to provide an electrical refrigeration unit to chill the brine of the counter current condensing chamber and to provide heat for the preheater.

An additional object of the invention is to provide a back wash capability for each part of the system which will contain a scale dissolving potable water for keeping the system clean. This back wash will be timed and sequenced by the computer processor.

Another object of the invention is to provide four degassing centrifugal vacuum chambers and four heated vacuum vaporization chambers, each of which operates as a batch process and is sequenced by the computer controller as sensors indicate the unit is operational from the stand point of temperature, pressure and vacuum.

Additional objects and advantages of the present invention will either be set forth in the description that follows, will be obvious from the description or may be learned by practice of the invention. The object and advantages of the invention may be obtained by the apparatus and method particularly pointed out in the appended claims.

In accordance with the principles of the present invention as embodied and as broadly described herein, a point of use water purification unit is revealed which continuously and completely purifies water at all points of use such as homes, restaurants, hotels and military field units, as well as desalinates sea water at the point of use. The device will remove all chemicals, kill all microorganisms and replete the water with essential ground minerals. The device is comprised of a computer monitored and controlled system for degassing, super heating and exploding water into a vacuum chamber, in which instant steam results. The steam is condensed in a counter current cold brine apparatus and stored in a holding tank containing ultraviolet light and is evacuated to the point of use by a booster pump flowing through a mineral repleting column and a carbon filter for freshness and the assurance of the absence of off taste.

Containment means are provided for holding these various components together in a compact package. The entire unit is monitored and controlled by a series of sensors, drivers and a computer processor.

Preferably, the containment means and all components should be covered compact and packaged for ease of installation and simplicity of operation. The unit may be housed either indoors or outdoors.

The accompanying drawings, which are incorporated in and constitute a part of this specification, illustrate the presently preferred embodiment of the invention and serve to explain the principles of the invention.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE PREFERRED EMBODIMENT

References will not be made in detail to the presently preferred embodiment of the invention, examples of which are illustrated in the accompanying drawings. Throughout the drawings, like referenced characters are used to designate like elements.

Figure 1:
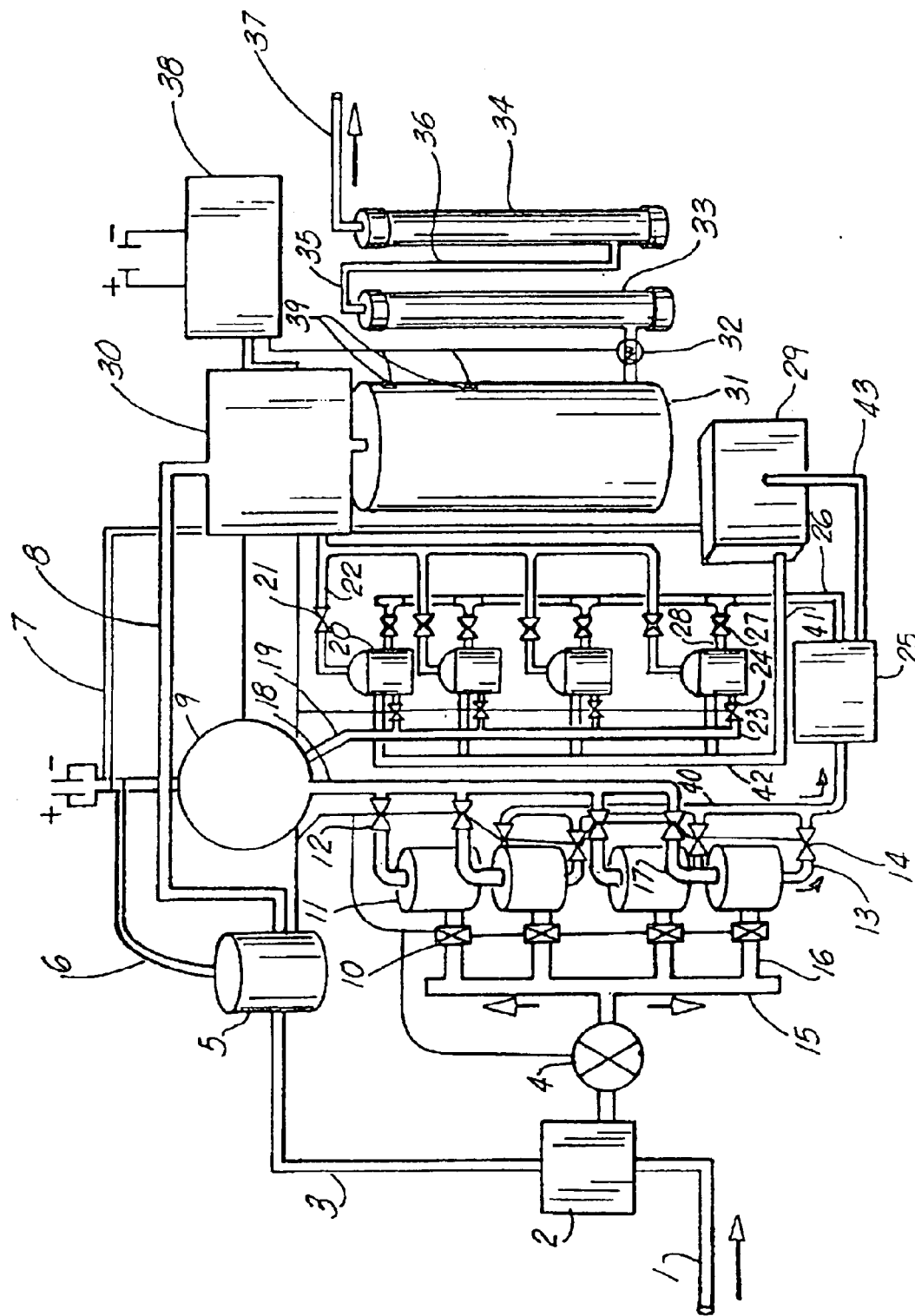
FIG. 1 is a comprehensive schematic drawing of the entire unit with its various components as well as indications as to the working mechanism.
Figure 2:
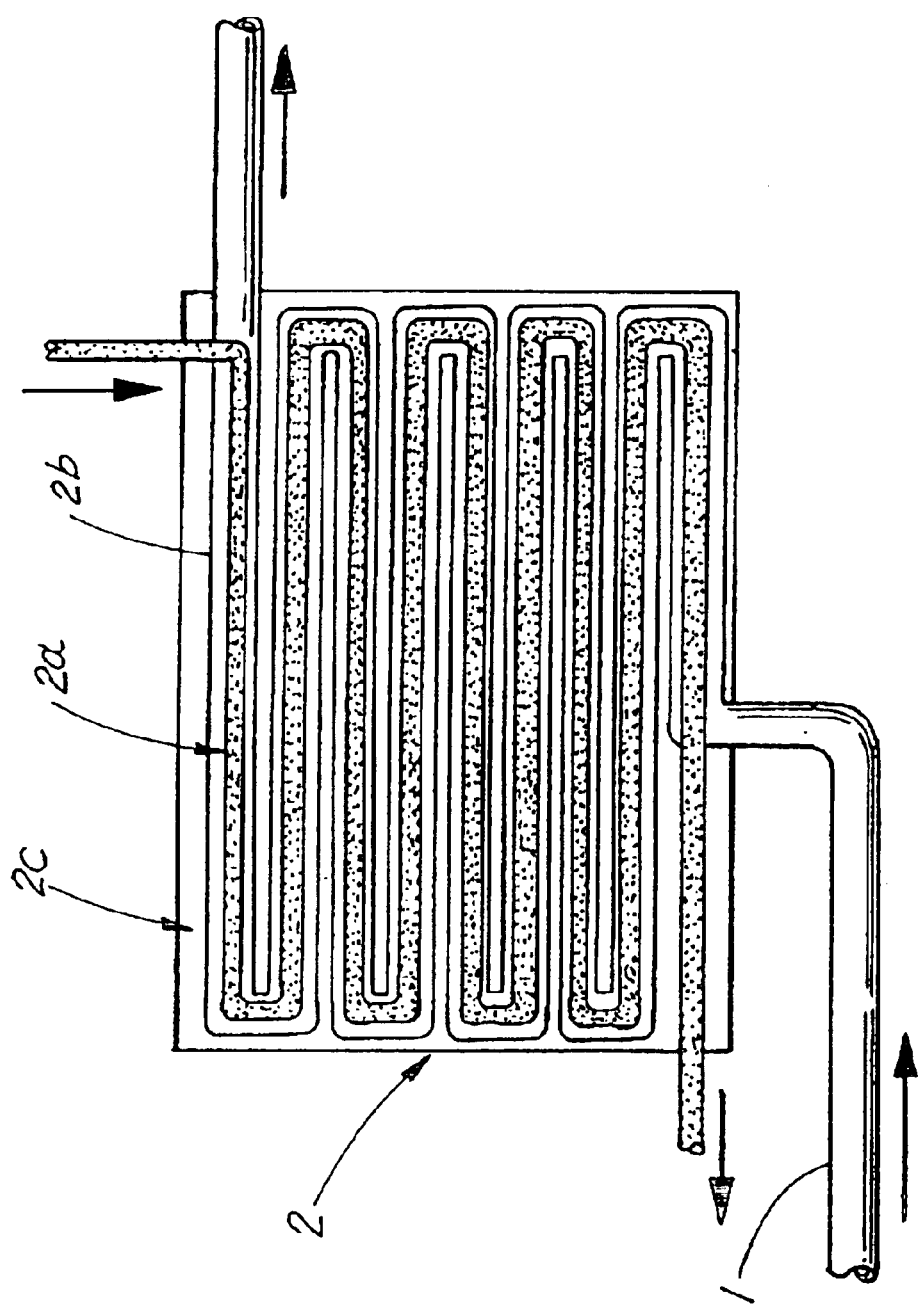
FIG. 2 is a detailed schematic of the intake water preheater unit which preheats the water from the cooling refrigeration unit condenser, showing the flow of hot gas and cool intake water in a counter current direction with the gas pipe being housed inside the water pipe.
Figure 3:
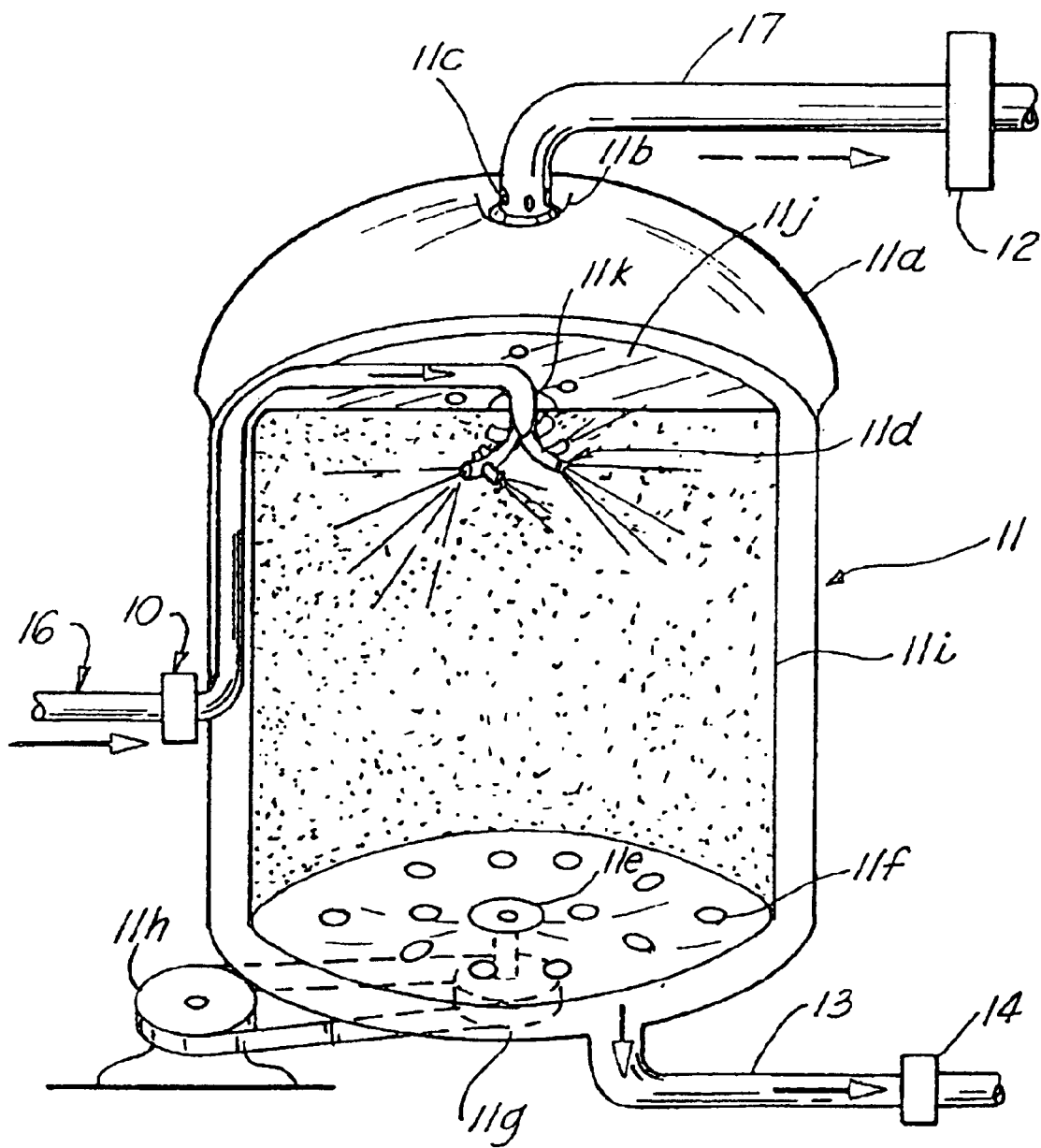
FIG. 3 is a detailed schematic of the degassing centrifugal vacuum chamber; one of four such chambers working on a batch principle and sequenced by a computer.

The water purification and conditioning unit of the invention are schematically illustrated in FIGS. 1–8. FIG. 1 reveals a general schematic of the entire system of this invention. Raw water from the source comes into the system through conduit 1. In FIG. 2, it then flows into counter current heat exchanger 2 where the water is preheated and the gas from the compressor is cooled. Water enters the heat exchanger 2 through conduit 1. The heated refrigerant enters the heat exchanger through conduit 2a which traverses the system inside conduit 2b. All of the conduits are held by attachment means 2c. This system flows in a counter current fashion and allows the most rapid heat exchanger feasible. Feed water then enters manifold 15 and is distributed to degassing pots 11 of FIG. 3 through conduit 16 and controlled by valve 10 which is regulated by computer 38. The four degassing pots have an inner centrifugally operated pot 11i which is about four liters in size. The centrifugal motion is driven by a small high speed motor 11h on the bottom of the pot 11h. There is an outer housing an inflow valve 10, an outflow valve 14 and a vacuum valve 12. Water flows into the centrifugal chamber where it is spun at 3–5 thousand RPM contained in a vacuum of 18–20 inches by circular vacuum pump 9 for 10–20 seconds. The unit is then stopped and the vacuum valve closed, water drains in to manifold 40. The four degassing chambers are being sequenced by the computer such that one is always filling, one is emptying and the other two are spinning or pumping vacuum. The detailed operation of the degassing is as follows. Preheated feed water enters the degassing chamber through conduit 16, through valve 10 and enters the centrifugal chamber 11i through opening 11k of baffle 11j. Water is sprayed onto the walls of chamber 11i by rotary water jets 11d. Chamber 11l is rotated at 3–5000 RPM by motor 11h while a vacuum is maintained through conduit 17. The vacuum is protected from water by baffle 11j and 11b. Vacuum ports 11c are above baffle 11b. In sequence, vacuum is applied, centrifugal speed is maximum and water is injected onto the walls of 11i. Vacuum is released and the degassed water exits through conduit 13 and valve 14.

Figure 4:
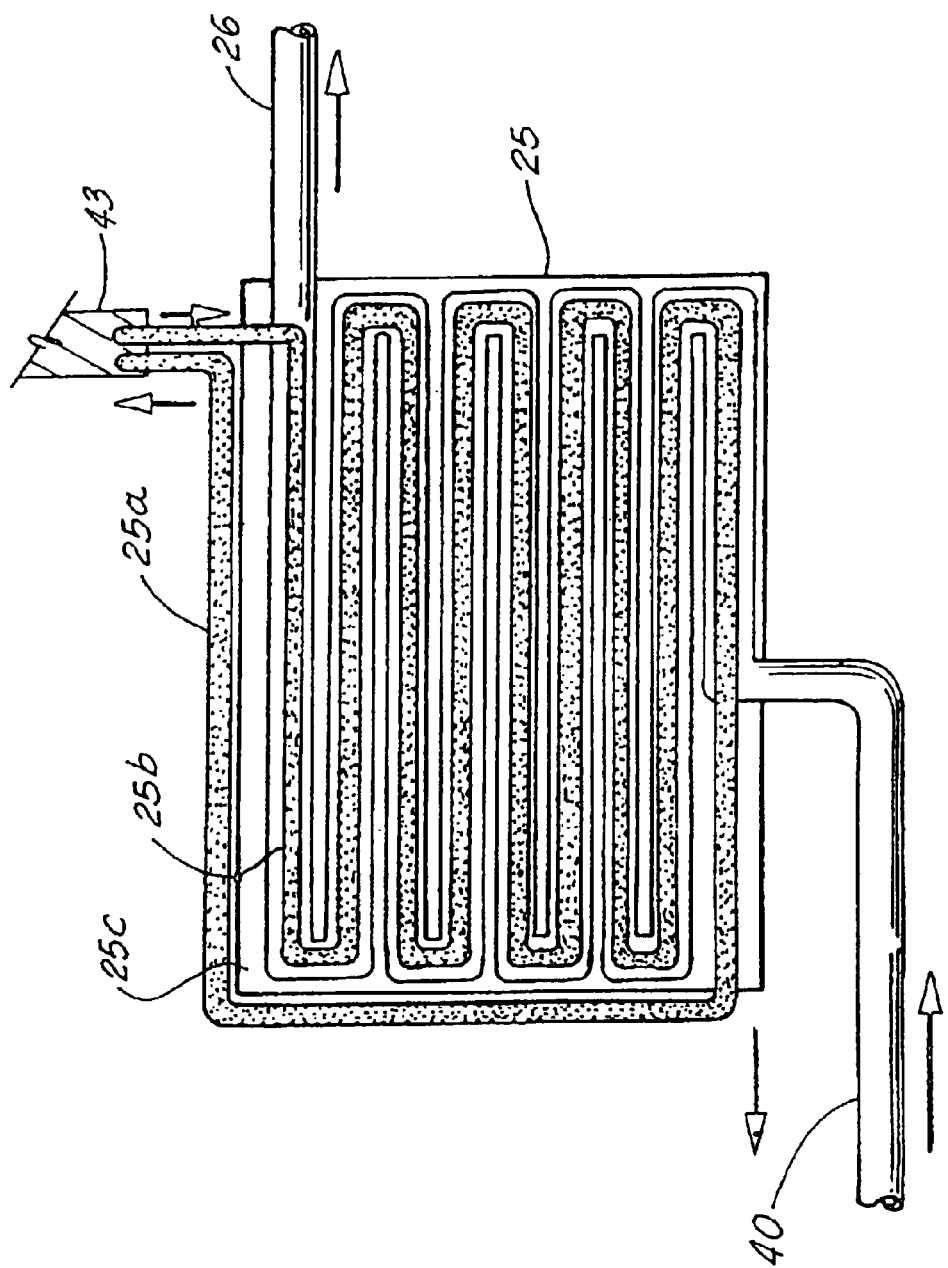
FIG. 4 is a detailed schematic of the counter current heat exchanger which will bring the degassed water temperature to 260 degrees F. under pressure.
Figure 5:
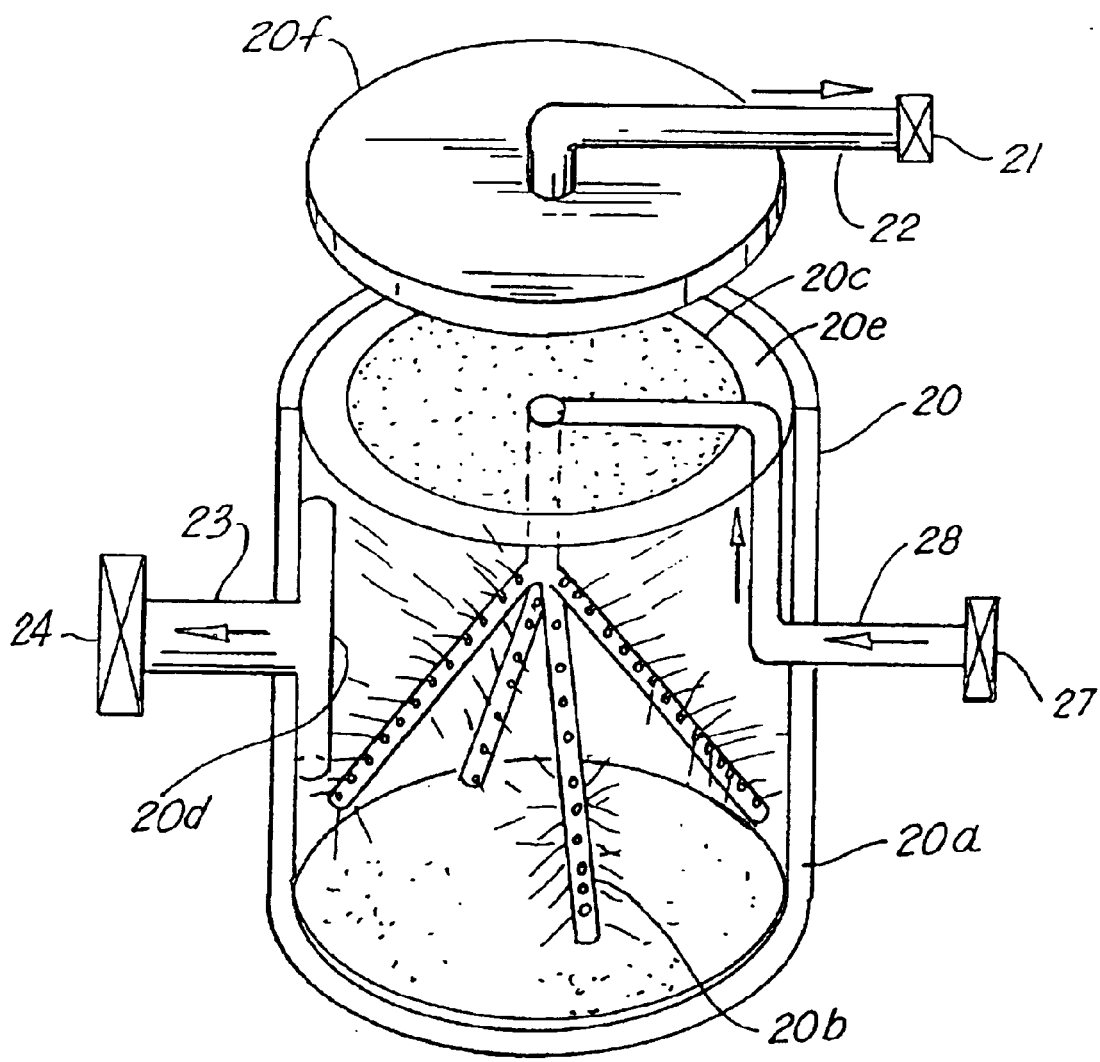
FIG. 5 is a detailed schematic of the heated vacuum expansion chamber of the invention with its heat source and regulator valve mechanism.
Figure 6:
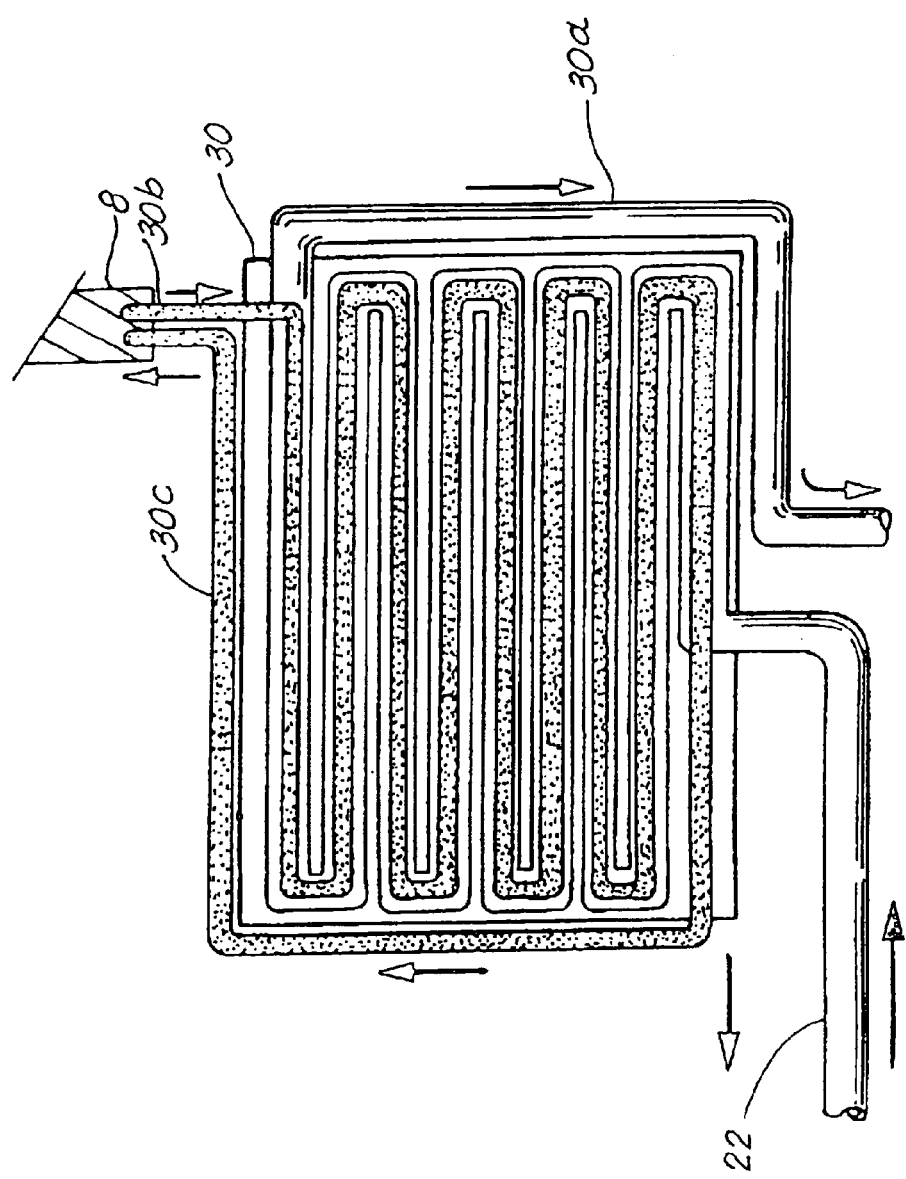
FIG. 6 is a detailed schematic of the brine counter current heat exchanger for cooling the steam distillate.
Figure 7:
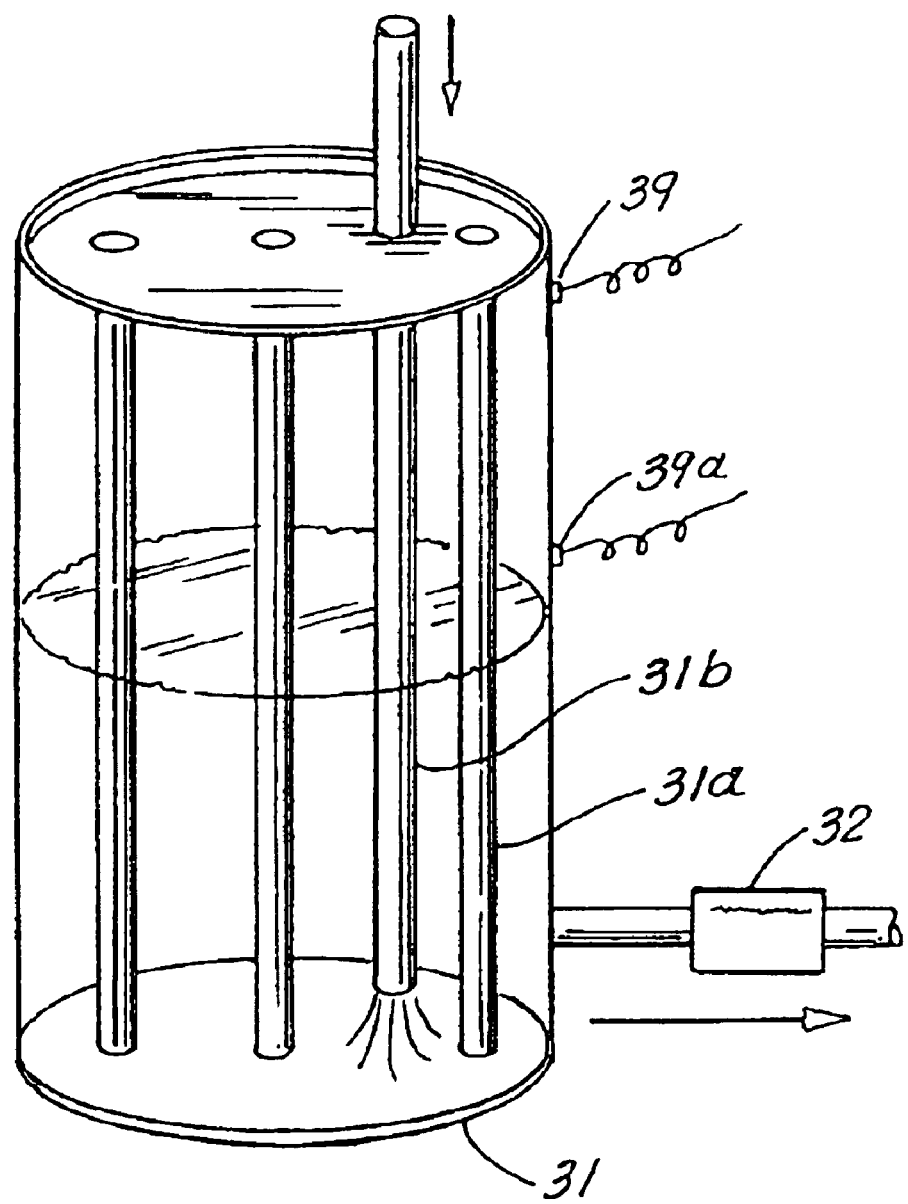
FIG. 7 is a detailed schematic of the ambient temperature holding tank, with level sensors and ultraviolet treatment tanks.
Figure 8:
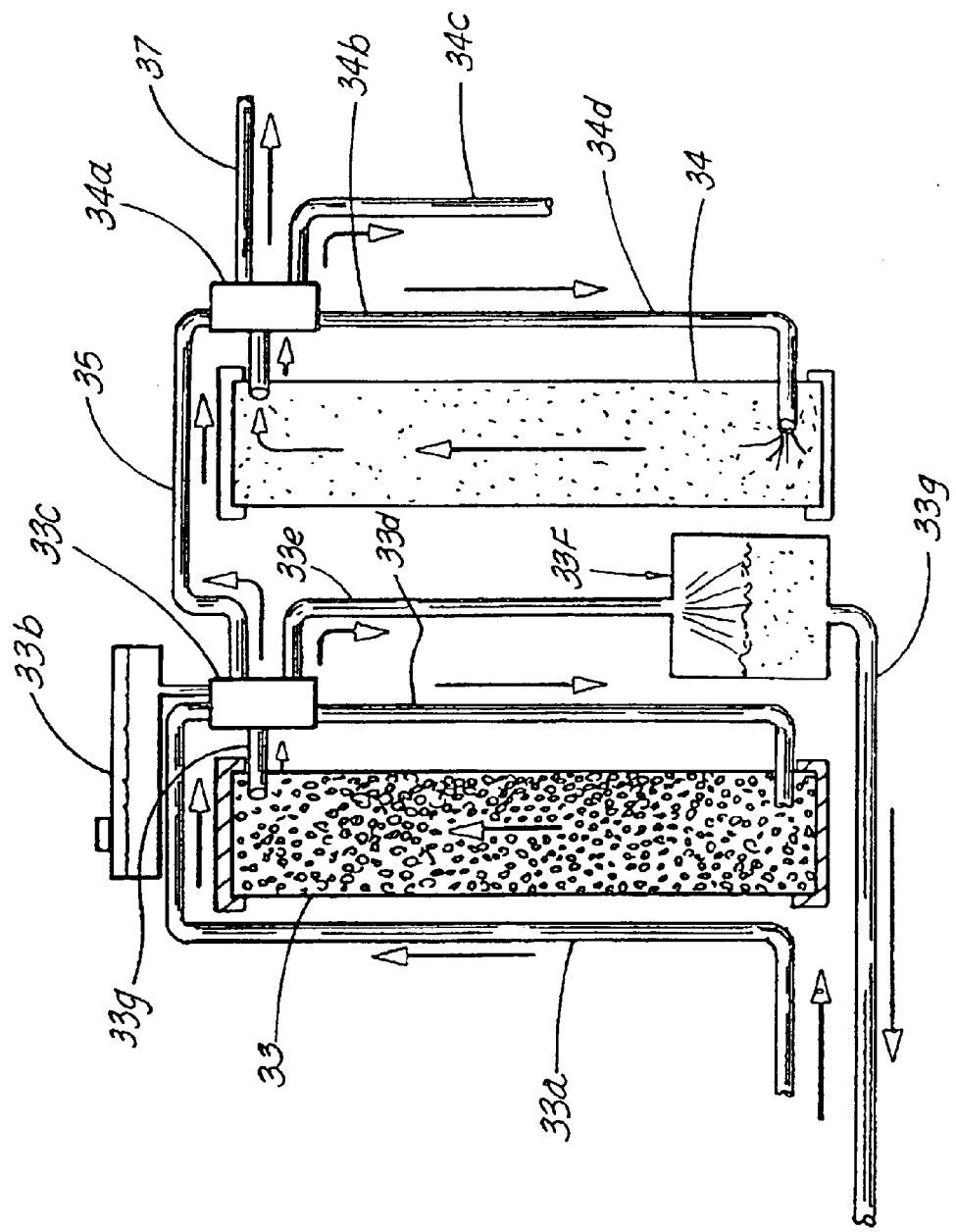
FIG. 8 is a detailed schematic of the filter tank: 1) mineral repletion column 2) carbon filter column.

Degassed water then enters counter current heat exchanger 25 where it is heated to 260 degrees F. In FIG. 4, heated vegetable oil at 260 degrees F. enters heat exchanger 25 through conduit 25b. Degassed water enters through conduit 40. Heated degassed water exits conduit 26 after picking up the heat in the counter current exchanger. The oil exits through conduit 25a to be reheated. Insulation 43 covers the heated oil conduits. The water then flows into conduit 26 where it is injected through valve 27 into the heated (360 degrees F.) vacuum expansion chamber. FIG. 5 represents the heated vacuum expansion chamber 20. Degassed water at 250 degrees F. and 10 PSI pressure is injected through valve 27 and conduit 28 (which goes through baffle 20c) onto the wall of the chamber through ejection ports 20b. The inner surface of the chamber is 350 degrees F. Prior to the injection, a vacuum is pulled through conduit 23, which is shielded by baffle 20d. The vacuum is locked in by valves 24, 21 and 27. Valve 27 opens to inject the water. It then closes and 21 opens to allow exit for the steam through opening 22. The chamber then recycles. The water instantly vaporizes, leaving all residue behind as the steam ejects itself through vale 21 and conduit 22 into the counter current brine chiller 30. FIG. 6 represents the brine counter current heat exchange for cooling the distillate. Steam enters the counter current heat exchanger through conduit 22. The chilled brine (20 degrees F.) enters in the opposite direction through conduit 30b. The condensed, cool, pure water exits through conduit 30a and the heat laden brine exits through conduit 30c to return to the chiller. The chilled brine conduits are insulate by covering 8. Free, microbe free water then drains into holding tank 31. FIG. 7 represents the holding tank 31 for the purified water. Pure water enters that tank through conduit 31b. Level sensors 39 and 39a control the operation of the system. UV tubes 31a maintain a microbe free tank of pure water. Water is then pumped by pump 32 into filter bank. Water level sensor 39 sends data to the computer which controls the various activation areas of the system. The tank contains UV sterilizer lamps to assure continued microbe free water. The water is then taken to the point of use through pump 32. FIG. 8 represents the filter bank of this invention which is made up of a mineral repletion column and an activate charcoal filter with conduit means, automated valve means and automatic back wash means. The pure water from the holding tank enters the mineral replacement unit 33 through conduit 33a. The mineral replacement unit contains porous rock to which is bound a carefully calculated mineral composition held to the porous rock as pumice by a proprietary mineral colloid. The mineral colloid mixture is held in feeder tank 33*b* and is programmed to cycle the desired amount through column 33, conduit 33*g* and conduit 33*d*. After cycling, any excess is injected into 33*f*. This solution then flows through conduit 33*g* on demand to back wash the entire system. Water flows from conduit 33*a* through the automated back wash system, through conduit 35 into auto backwash 34*a*, then through conduit 34*d* to the bottom of the carbon filter bank and then out through conduits 37 to the point of consumption.

Preheater (heat exchanger) 25 is heated by vegetable oil from heat source and pump 29 (260 degrees F.). Heat jackets for vacuum expansion chamber 20 are kept at 350 degrees F. by circulating vegetable oil pumped into and returning through conduit 41 into manifold 42. The conduits 43, 41 and 42 are double conduits (both inflow and outflow).

Since there are four (4) parallel batch steps in this device design, the flow of water has no detectable difference from a flow through system.

Automatic backwash is computer controlled and is done at times of no use demands on the water level in tank 31.

The following table lists the part numbers and part descriptions as used herein and in the drawings attached hereto.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed is:

1. A method of purifying, comprising the following steps:
   a) providing a quantity of degassed water;
   b) heating the degassed water to at least 260 degrees F.;
   c) injecting the heated degassed water into a vacuum chamber to superheat the water to at least 350 degrees F.; and
   d) allowing the super heated degassed water to vaporize in an explosive fashion, evaporating rapidly and condensing in a counter current chiller.

2. The method of in claim 1, further comprising the step of draining the condensed water into a holding tank.

3. The method in claim 1, further comprising the step of pumping the condensed water out through a mineral column and a carbon column to replenish the trace minerals and remove any residual off taste.

4. The method in claim 1, further comprising the step of attaching an incoming water line to a counter current heat exchanger to preheat the incoming water and cool the high side gas in a refrigeration unit.

5. The method in claim 4, wherein the heat exchanger further comprises a first counter current conduit contained within a gas conduit.

6. The method in claim 4, wherein the water incoming into the counter current exchanger is the same temperature as the exiting gas and the exiting water is the same temperature as the incoming gas.

7. The method in claim 1, further comprising the step of providing an electronically controlled valve for controlling degassed water.

8. The method in claim 1, wherein the degassed water enters a band of centrifugal, vacuum chambers through a manifold and electronic valving system, closing 2 electronic valves and wherein the centrifugal force forms a thin layer of water and the vacuum as well as the centrifugal force brings about a removal of dissolved gases from the feed water.

* * * * *